(12) United States Patent
Imamura et al.

(10) Patent No.: US 9,075,301 B2
(45) Date of Patent: Jul. 7, 2015

(54) OPTICAL COMPONENT AND OPTICAL SYSTEM

(75) Inventors: Kentarou Imamura, Osaka (JP); Shigeto Yoshida, Osaka (JP); Takafumi Shimatani, Osaka (JP); Hisashi Watanabe, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 232 days.

(21) Appl. No.: 13/643,776

(22) PCT Filed: Apr. 26, 2011

(86) PCT No.: PCT/JP2011/060119
§ 371 (c)(1),
(2), (4) Date: Oct. 26, 2012

(87) PCT Pub. No.: WO2011/136200
PCT Pub. Date: Nov. 3, 2011

(65) Prior Publication Data
US 2013/0038934 A1 Feb. 14, 2013

(30) Foreign Application Priority Data
Apr. 28, 2010 (JP) ................. 2010-104393

(51) Int. Cl.
*G02B 27/28* (2006.01)
*G03B 21/604* (2014.01)
(Continued)

(52) U.S. Cl.
CPC ............ *G03B 21/604* (2013.01); *G02B 27/286* (2013.01); *G02F 1/1335* (2013.01); *G02F 2001/133541* (2013.01); *G02F 2001/133562* (2013.01); *G02F 2001/133627* (2013.01);
(Continued)

(58) Field of Classification Search
CPC .......... G02B 1/04; G02B 5/3033; G02B 5/30; G02B 5/3025; G02F 1/133528; G02F 1/13363
USPC .................. 359/364, 483.01, 489.01, 489.02, 359/489.07, 838, 850
See application file for complete search history.

(56) References Cited

U.S. PATENT DOCUMENTS 5,420,683 A * 5/1995 Hall ............................. 356/467
6,300,929 B1 * 10/2001 Hisatake et al. ................ 345/94
(Continued)

FOREIGN PATENT DOCUMENTS

JP 2004219467 A 8/2004
JP 2008-158114 A 7/2008
(Continued)

OTHER PUBLICATIONS

International Preliminary Report on Patentability dated Dec. 20, 2012.
(Continued)

*Primary Examiner* — Frank Font
(74) *Attorney, Agent, or Firm* — Harness, Dickey & Pierce, P.L.C.

(57) ABSTRACT

An optical element according to an embodiment of the present invention includes: a reflective imaging element for reflecting light from an object an even number of times to cause an image of the object to be formed; a first polarizer disposed on a light-outgoing side of the reflective imaging element; and a first phase difference plate disposed between the reflective imaging element and the first polarizer.

20 Claims, 5 Drawing Sheets

(51) Int. Cl.
    *G02B 27/22*    (2006.01)
    *G02F 1/1335*   (2006.01)
    *G02F 1/13363*  (2006.01)
(52) U.S. Cl.
    CPC . *G02F2001/133638* (2013.01); *G02F 2201/38* (2013.01); *G02F 2413/07* (2013.01); *G02F 2413/11* (2013.01); G02B 27/2292 (2013.01)

(56) References Cited

U.S. PATENT DOCUMENTS

| | | | |
|---|---|---|---|
| 7,066,600 B2* | 6/2006 | Nakashima et al. | 353/20 |
| 7,397,604 B2* | 7/2008 | Hruska | 359/260 |
| 7,835,080 B2 | 11/2010 | Taguchi et al. | |
| 7,965,448 B2 | 6/2011 | Maekawa | |
| 2003/0098856 A1* | 5/2003 | Li | 345/173 |
| 2009/0310231 A1 | 12/2009 | Maekawa | |
| 2010/0214394 A1 | 8/2010 | Maekawa | |
| 2010/0231860 A1 | 9/2010 | Maekawa | |
| 2011/0235201 A1 | 9/2011 | Maekawa | |

FOREIGN PATENT DOCUMENTS

| | | |
|---|---|---|
| JP | 2009-025776 A | 2/2009 |
| JP | 2009-042337 A | 2/2009 |
| JP | 2009-075483 A | 4/2009 |
| JP | 2009-276699 A | 11/2009 |
| WO | WO-00/65844 A1 | 11/2000 |
| WO | WO-2006059686 A1 | 6/2006 |
| WO | WO-2007/116639 A1 | 10/2007 |

OTHER PUBLICATIONS

International Search Report PCT/ISA/210, (document filed Dec. 26, 2012).

* cited by examiner (a)

(b)

(c)

OPTICAL COMPONENT AND OPTICAL SYSTEM

TECHNICAL FIELD

The present invention relates to an optical system having a reflective imaging element which is capable of forming an image of an object in a space and a display panel.

BACKGROUND ART

In recent years, an optical system for forming an image of an object in a space by using a reflective imaging element has been proposed (for example, Patent Documents 1 to 6). The optical system includes a reflective imaging element and an object, and an image to be displayed in a space (referred to as an aerial image) is an image of the object, which forms at a position of planar symmetry with respect to the reflective imaging element as a plane of symmetry.

The reflective imaging element disclosed in Patent Document 1 has a plurality of throughholes penetrating through a plate-like substrate along its thickness direction, such that an optical element composed of two orthogonally-disposed specular elements is formed on the inner walls of each hole (see FIG. 4 of Patent Document 1), or has a plurality of transparent chimneys protruding in the thickness direction of the substrate, such that an optical element composed of two orthogonally-disposed specular elements is formed on the inner wall surface of each chimney (see FIG. 7 of Patent Document 1).

In the reflective imaging elements disclosed in Patent Documents 1, 2, and 5, tens to hundreds of thousands of square holes, each of whose sides measures about 50 μm to 1000 μm, are formed in a substrate having a thickness of 50 μm to 1000 μm, the inner surface of each hole being mirror coated by electroforming technique, nanoprinting technique, or sputtering technique.

Moreover, a reflective imaging element which is disclosed in Patent Document 6 is formed by placing two members, having specular surfaces which are disposed mutually parallel along the longitudinal direction, in overlying relationship in such a manner that the specular elements of the respective members orthogonally intersect (see FIG. 4 of Patent Document 6). Another reflective imaging element has two members, which include numerous elongated grooves that are dug in parallel to one another along the longitudinal direction, and is formed by placing the two transparent substrates in overlying relationship so that smooth surfaces which are formed within the grooves of the respective members for causing total reflection of light orthogonally intersect (see FIG. 9 of Patent Document 6).

The aforementioned optical system in which a reflective imaging element is used utilizes specular reflection or total reflection of the reflective imaging element, and, according to its principles, the ratio in size between the image of the object and the image appearing in the space is 1:1.

For reference sake, the entire disclosure of Patent Documents 1 to 6 is incorporated herein by reference.

CITATION LIST

Patent Literature

[Patent Document 1] Japanese Laid-Open Patent Publication No. 2008-158114
[Patent Document 2] Japanese Laid-Open Patent Publication No. 2009-75483
[Patent Document 3] Japanese Laid-Open Patent Publication No. 2009-42337
[Patent Document 4] Japanese Laid-Open Patent Publication No. 2009-25776
[Patent Document 5] International Publication No. 2007/116639
[Patent Document 6] Japanese Laid-Open Patent Publication No. 2009-276699

SUMMARY OF INVENTION

Technical Problem

An optical system having a reflective imaging element as described above allows an image to be formed when light is reflected twice at two mutually-orthogonal specular elements or smooth surfaces (hereinafter referred to as "specular elements") which are possessed by the reflective imaging element. However, it is not that all light that is incident on the reflective imaging element is utilized for image formation; rather, there occurs some stray light not contributing to image formation. As the stray light mixes with light contributing to image formation, visual recognition of the aerial image is deteriorated. Moreover, reflection of external light at the viewer's-side surface of the reflective imaging element may also be a factor that deteriorates visual recognition of the aerial image.

The present invention has been made in order to solve the aforementioned problems, and an objective thereof is to provide an optical element including a reflective imaging element which allows for an improved visual recognition of an aerial image, and an optical system having such an optical element.

Solution to Problem

An optical element according to an embodiment of the present invention comprises: a reflective imaging element for reflecting light from an object an even number of times to cause an image of the object to be formed; a first polarizer disposed on a light-outgoing side of the reflective imaging element; and a first phase difference plate disposed between the reflective imaging element and the first polarizer.

In one embodiment, the optical element further comprises an antireflection film on the light-outgoing side of the reflective imaging element, the first polarizer being disposed between the antireflection film and the first phase difference plate.

In one embodiment, the optical element further comprises a transparent substrate on at least one of the light-outgoing side and a light-incident side of the reflective imaging element.

In one embodiment, the first phase difference plate includes a λ/4 plate.

In one embodiment, when viewing the optical element from a normal direction of a light-outgoing side of the optical element, or from a light direction in which the light from the object goes out from the optical element, a positive direction being defined counterclockwise, and a negative direction being defined clockwise, an angle between an absorption axis of the first polarizer and a slow axis of the λ/4 plate is $(45+x)°$ or $-(45+x)°$, where the relationship $-8 \leq x \leq 10$ is satisfied.

In one embodiment, the first phase difference plate includes a λ/2 plate.

In one embodiment, the first phase difference plate includes the λ/2 plate and the λ/4 plate; when viewing the optical element from a normal direction of a light-outgoing side of the optical element, or from a light direction in which the light from the object goes out from the optical element, a positive direction being defined counterclockwise, and a negative direction being defined clockwise, an angle between an absorption axis of the first polarizer and a slow axis of the λ/2 plate being defined as θ, an angle between the absorption axis of the first polarizer and a slow axis of the λ/4 plate is ±((2|θ|+45)+y)°, where the relationship −29≤y≤30 is satisfied.

In one embodiment, when θ has a positive value, the angle between the absorption axis of the first polarizer and the slow axis of the λ/4 plate is ((2|θ|+45)+y)°; and when θ has a negative value, the angle between the absorption axis of the first polarizer and the slow axis of the λ/4 plate is −((2|θ|+45)+y)°.

In one embodiment, when principal axes of an index ellipsoid of the λ/2 plate are designated an a axis, a b axis, and a c axis, the c axis being the closest principal axis to a normal direction of a principal face of the λ/2 plate, and assuming respective principal refractive indices $n_a$, $n_b$, and $n_c$ thereon with respect to light having a wavelength of 550 nm, the λ/2 plate satisfies the relationship $n_a \geq n_b$, and satisfies $0.1 \leq N_z \leq 1$ where $N_z = (n_a - n_c)/(n_a - n_b)$; and an in-plane retardation Re of the λ/2 plate with respect to light having the wavelength of 550 nm satisfies the relationship 235 nm≤Re≤310 nm. Preferably, $N_z$ satisfies $N_z = 0.5$.

In one embodiment, when principal axes of an index ellipsoid of the λ/4 plate are designated an a axis, a b axis, and a c axis, the c axis being the closest principal axis to a normal direction of a principal face of the λ/4 plate, and assuming respective principal refractive indices $n_a$, $n_b$, and $n_c$ thereon with respect to light having a wavelength of 550 nm, the λ/4 plate satisfies the relationship $n_a \geq n_b$, and satisfies $0.1 \leq N_z \leq 1$ where $N_z = (n_a - n_c)/(n_a - n_b)$; and an in-plane retardation Re of the λ/4 plate with respect to light having the wavelength of 550 nm satisfies the relationship 100 nm≤Re≤170 nm. Preferably, $N_z$ satisfies $N_z = 0.5$.

In one embodiment, the first phase difference plate includes a uniaxial optical compensation element; and when principal axes of an index ellipsoid of the uniaxial optical compensation element are designated an a axis, a b axis, and a c axis, the c axis being the closest principal axis to a normal direction of a principal face of the uniaxial optical compensation element, and assuming respective principal refractive indices $n_a$, $n_b$, and $n_c$ thereon with respect to light having a wavelength of 550 nm, the relationship $n_c > n_a = n_b$ or $n_c = n_a > n_b$ is satisfied.

In one embodiment, the first phase difference plate includes the uniaxial optical compensation element, the uniaxial optical compensation element being disposed so that the a axis or the b axis of the uniaxial optical compensation element and a slow axis of at least one phase plate among phase difference plates of the first phase difference plate other than the uniaxial optical compensation element are essentially parallel; and when principal axes of an index ellipsoid of the first phase difference plate are designated an a axis, a b axis, and a c axis, the c axis being the closest principal axis to a normal direction of a principal face of the uniaxial optical compensation element, and assuming respective principal refractive indices $n_a$, $n_b$, and $n_c$ thereon with respect to light having a wavelength of 550 nm and defining $N_z = (n_a - n_c)/(n_a - n_b)$, the relationship $0.1 \leq N_z \leq 1$ is satisfied. Preferably, $N_z$ satisfies $N_z = 0.5$. In the present specification, "essentially parallel" encompasses not only 0°, but also an angular range of several more or less degrees therefrom that can be regarded as 0°, e.g., 0°±5°.

In one embodiment, the first phase difference plate includes a biaxial optical compensation element; and when principal axes of an index ellipsoid of the biaxial optical compensation element are designated an a axis, a b axis, and a c axis, the c axis being the closest principal axis to a normal direction of a principal face of the biaxial optical compensation element, and assuming respective principal refractive indices $n_a$, $n_b$, and $n_c$ thereon with respect to light having a wavelength of 550 nm, the relationship $n_c > n_a > n_b$ is satisfied.

In one embodiment, the first phase difference plate includes the biaxial optical compensation element, the biaxial optical compensation element being disposed so that the a axis or the b axis of the biaxial optical compensation element and a slow axis of at least one phase plate among phase difference plates of the first phase difference plate other than the biaxial optical compensation element are essentially parallel; and when principal axes of an index ellipsoid of the first phase difference plate are designated an a axis, a b axis, and a c axis, the c axis being the closest principal axis to a normal direction of a principal face of the biaxial optical compensation element, and assuming respective principal refractive indices $n_a$, $n_b$, and $n_c$ thereon with respect to light having a wavelength of 550 nm and defining $N_z = (n_a - n_c)/(n_a - n_b)$, the relationship $0.1 \leq N_z \leq 1$ is satisfied. Preferably, $N_z$ satisfies $N_z = 0.5$.

In one embodiment, a tilting angle, being defined as an angle between the direction of the c axis and the normal direction of the principal face, is an incident angle of light incident on the optical element from the object.

Another optical element comprises: a reflective imaging element for reflecting light from an object an even number of times to cause an image of the object to be formed; a first polarizer disposed on a light-outgoing side of the reflective imaging element; a first phase difference plate disposed between the reflective imaging element and the first polarizer; and a second phase difference plate disposed on a light-incident side of the reflective imaging element.

In one embodiment, the optical element further comprises an antireflection film on the light-outgoing side of the reflective imaging element, the first polarizer being disposed between the antireflection film and the first phase difference plate.

In one embodiment, the optical element further comprises a transparent substrate on at least one of the light-incident side and the light-outgoing side of the reflective imaging element.

The first phase difference plate and the second phase difference plate include a λ/4 plate.

In one embodiment, the first phase difference plate includes the λ/4 plate; when viewing the optical element from a normal direction of a light-outgoing side of the optical element, or from a light direction in which the light from the object goes out from the optical element, a positive direction being defined counterclockwise, and a negative direction being defined clockwise, an angle between an absorption axis of the first polarizer and a slow axis of the λ/4 plate is (45+x)° or −(45+x)°, where the relationship −8≤x≤10 is satisfied.

In one embodiment, the second phase difference plate includes the λ/4 plate; and when viewing the optical element from a normal direction of a light-outgoing side of the optical element, or from a light direction in which the light from the object goes out from the optical element, a positive direction being defined counterclockwise, and a negative direction being defined clockwise, an angle between an absorption axis or a transmission axis of the first polarizer and a slow axis of the λ/4 plate is (45+x)° or −(45+x)°, where the relationship −8≤x≤10 is satisfied.

In one embodiment, at least one of the first phase difference plate and the second phase difference plate includes a λ/2 plate.

In one embodiment, the first phase difference plate includes the λ/2 plate and the λ/4 plate; and when viewing the optical element from a normal direction of a light-outgoing side of the optical element, or from a light direction in which the light from the object goes out from the optical element, a positive direction being defined counterclockwise, and a negative direction being defined clockwise, an angle between an absorption axis of the first polarizer and a slow axis of the λ/2 plate being defined as θ, an angle between the absorption axis of the first polarizer and a slow axis of the λ/4 plate is $\pm((2|\theta|+45)+y)°$, where the relationship $-31 \leq y \leq 29$ is satisfied.

In one embodiment, the second phase difference plate includes the λ/2 plate and the λ/4 plate; and when viewing the optical element from a normal direction of a light-outgoing side of the optical element, or from a light direction in which the light from the object goes out from the optical element, a positive direction being defined counterclockwise, and a negative direction being defined clockwise, an angle between an absorption axis or a transmission axis of the first polarizer and a slow axis of the λ/2 plate being defined as θ, an angle between the absorption axis or transmission axis of the first polarizer and a slow axis of the λ/4 plate is $\pm((2|\theta|+45)+y)°$, where the relationship $-31 \leq y \leq 29$ is satisfied.

In one embodiment, when θ has a positive value, the angle between the absorption axis or transmission axis of the first polarizer and the slow axis of the λ/4 plate is $((2|\theta|+45)+y)°$; and when θ has a negative value, the angle between the absorption axis or transmission axis of the first polarizer and the slow axis of the λ/4 plate is $-((2|\theta|+45)+y)°$.

In one embodiment, when principal axes of an index ellipsoid of the λ/2 plate are designated an a axis, a b axis, and a c axis, the c axis being the closest principal axis to a normal direction of a principal face of the λ/2 plate, and assuming respective principal refractive indices $n_a$, $n_b$, and $n_c$ thereon with respect to light having a wavelength of 550 nm, the λ/2 plate satisfies the relationship $n_a \geq n_b$, and satisfies $0.1 \leq N_z \leq 1$ where $N_z=(n_a-n_c)/(n_a-n_b)$; and an in-plane retardation Re of the λ/2 plate with respect to light having the wavelength of 550 nm satisfies the relationship $235\ nm \leq Re \leq 310\ nm$. Preferably, $N_z$ satisfies $N_z=0.5$.

In one embodiment, when principal axes of an index ellipsoid of the λ/4 plate are designated an a axis, a b axis, and a c axis, the c axis being the closest principal axis to a normal direction of a principal face of the λ/4 plate, and assuming respective principal refractive indices $n_a$, $n_b$, and $n_c$ thereon with respect to light having a wavelength of 550 nm, the λ/4 plate satisfies the relationship $n_a \geq n_b$, and satisfies $0.1 \leq N_z \leq 1$ where $N_z=(n_a-n_c)/(n_a-n_b)$; and an in-plane retardation Re of the λ/4 plate with respect to light having the wavelength of 550 nm satisfies the relationship $100\ nm \leq Re \leq 170\ nm$. Preferably, $N_z$ satisfies $N_z=0.5$.

In one embodiment, at least one of the first and second phase difference plates includes a uniaxial optical compensation element; and when principal axes of an index ellipsoid of the uniaxial optical compensation element are designated an a axis, a b axis, and a c axis, the c axis being the closest principal axis to a normal direction of a principal face of the uniaxial optical compensation element, and assuming respective principal refractive indices $n_a$, $n_b$, and $n_c$ thereon with respect to light having a wavelength of 550 nm, the relationship $n_c > n_a = n_b$ or $n_c = n_a > n_b$ is satisfied.

In one embodiment, the first phase difference plate includes the uniaxial optical compensation element, the uniaxial optical compensation element being disposed so that the a axis or the b axis of the uniaxial optical compensation element and a slow axis of at least one phase difference plate among phase difference plates of the first phase difference plate other than the uniaxial optical compensation element are essentially parallel; and when principal axes of an index ellipsoid of the first phase difference plate are designated an a axis, a b axis, and a c axis, the c axis being the closest principal axis to a normal direction of a principal face of the uniaxial optical compensation element, and assuming respective principal refractive indices $n_a$, $n_b$, and $n_c$ thereon with respect to light having a wavelength of 550 nm and defining $N_z=(n_a-n_b)/(n_a-n_b)$, the relationship $0.1 \geq N_z=1$ is satisfied. Preferably, $N_z$ satisfies $N_z=0.5$.

In one embodiment, the second phase difference plate includes a uniaxial optical compensation element, the uniaxial optical compensation element being disposed so that the a axis or the b axis of the uniaxial optical compensation element and a slow axis of at least one phase difference plate among phase difference plates of the second phase difference plate other than the uniaxial optical compensation element are essentially parallel; and when principal axes of an index ellipsoid of the second phase difference plate are designated an a axis, a b axis, and a c axis, the c axis being the closest principal axis to a normal direction of a principal face of the uniaxial optical compensation element, and assuming respective principal refractive indices $n_a$, $n_b$, and $n_c$, thereon with respect to light having a wavelength of 550 nm and defining $N_z=(n_a-n_c)/(n_a-n_b)$, the relationship $0.1 \leq N_z=1$ is satisfied. Preferably, $N_z$ satisfies $N_z=0.5$.

In one embodiment, at least one of the first phase difference plate and the second phase difference plate includes a biaxial optical compensation element; and when principal axes of an index ellipsoid of the biaxial optical compensation element are designated an a axis, a b axis, and a c axis, the c axis being the closest principal axis to a normal direction of a principal face of the biaxial optical compensation element, and assuming respective principal refractive indices $n_a$, $n_b$, and $n_c$ thereon with respect to light having a wavelength of 550 nm, the relationship $n_c > n_a > n_b$ is satisfied.

In one embodiment, the first phase difference plate includes the biaxial optical compensation element, the biaxial optical compensation element being disposed so that the a axis or the b axis of the biaxial optical compensation element and a slow axis of at least one phase plate among phase difference plates of the first phase difference plate other than the biaxial optical compensation element are essentially parallel; and when principal axes of an index ellipsoid of the first phase difference plate are designated an a axis, a b axis, and a c axis, the c axis being the closest principal axis to a normal direction of a principal face of the biaxial optical compensation element, and assuming respective principal refractive indices $n_a$, $n_b$, and $n_c$ thereon with respect to light having a wavelength of 550 nm and defining $N_z=(n_a-n_c)/(n_a-n_b)$, the relationship $0.1 \leq N_z \leq 1$ is satisfied. Preferably, $N_z$ satisfies $N_z=0.5$.

In one embodiment, the second phase difference plate includes the biaxial optical compensation element, the biaxial optical compensation element being disposed so that the a axis or the b axis of the biaxial optical compensation element and a slow axis of at least one phase plate among phase difference plates of the second phase difference plate other than the biaxial optical compensation element are essentially parallel; and when principal axes of an index ellipsoid of the second phase difference plate are designated an a axis, a b axis, and a c axis, the c axis being the closest principal axis to a normal direction of a principal face of the biaxial optical compensation element, and assuming respective principal refractive indices $n_a$, $n_b$, and $n_c$ thereon with respect to light having a wavelength of 550 nm and defining $N_z=(n_a-n_c)/(n_a-n_b)$, the relationship $0.1 \leq N_z \leq 1$ is satisfied. Preferably, $N_z$ satisfies $N_z=0.5$.

In one embodiment, a tilting angle, being defined as an angle between the direction of the c axis and the normal direction of the principal face, is an incident angle of light incident on the optical element from the object.

In one embodiment, the optical element comprises a second polarizer disposed on the light-incident side of the reflective imaging element, wherein, the second phase difference plate is disposed between the reflective imaging element and the second polarizer.

In one embodiment, when viewing the first polarizer and the second polarizer from a light-outgoing side of the optical element, or from a light direction in which the light from the object goes out from the optical element, the first polarizer and the second polarizer are disposed so that an absorption axis of the first polarizer and an absorption axis of the second polarizer are essentially parallel or essentially orthogonal. In the present specification, "essentially orthogonal" encompasses not only 90°, but also an angular range of several more or less degrees therefrom that can be regarded as 90°, e.g., 90°±5°.

An optical system according to the present invention comprises: any of the above optical elements; and a display panel disposed on a light-incident side of the optical element, the optical system causing an image displayed on a display surface of the display panel to form an image at a position of planar symmetry with respect to the optical element as a plane of symmetry, wherein light emitted from the display panel is circularly polarized light or elliptically polarized light.

Another optical system comprises: any of the above optical elements; and a display panel disposed on a light-incident side of the optical element, the optical system causing an image displayed on a display surface of the display panel to form an image at a position of planar symmetry with respect to the optical element as a plane of symmetry, wherein light emitted from the display panel is linearly polarized light.

In one embodiment, the display panel is disposed so that, when viewing the first polarizer and the display panel from a light-outgoing side of the optical element, or from a light direction in which the light from the object goes out from the optical element, an absorption axis of a polarizer at the display surface side of the display panel and an absorption axis of the first polarizer are essentially parallel or essentially orthogonal.

Still another optical system comprises: any of the above optical elements; and a display panel disposed on a light-incident side of the optical element, the optical system causing an image displayed on a display surface of the display panel to form an image at a position of planar symmetry with respect to the optical element as a plane of symmetry.

Advantageous Effects of Invention

According to the present invention, an optical element which allows for an improved visual recognition of an aerial image, and an optical system having such an optical element, are provided.

DESCRIPTION OF EMBODIMENTS

Hereinafter, with reference to drawings, embodiments of the present invention will be described. The present invention is not limited to the illustrated embodiments.

Figure 1:
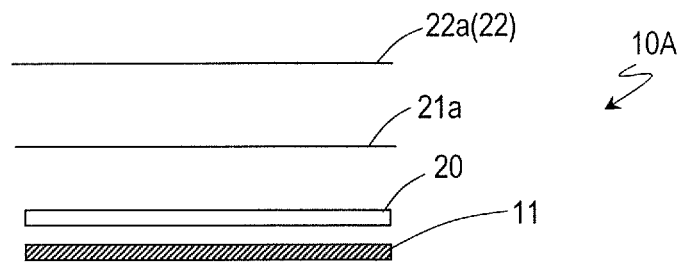
[FIG. 1] (a) to (c) are schematic cross-sectional views showing the constructions of optical elements 10A, 10B, and 10C according to embodiments of the present invention.
Figure 1:
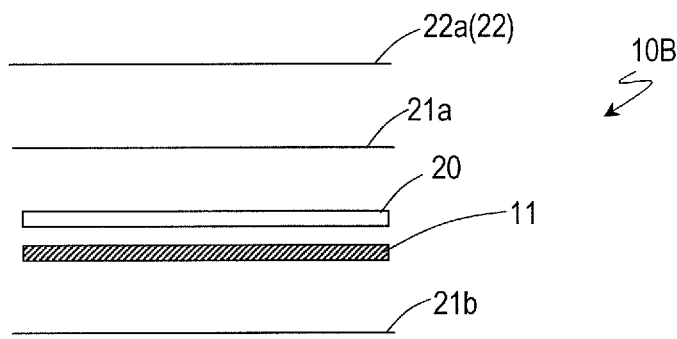
Figure 1:
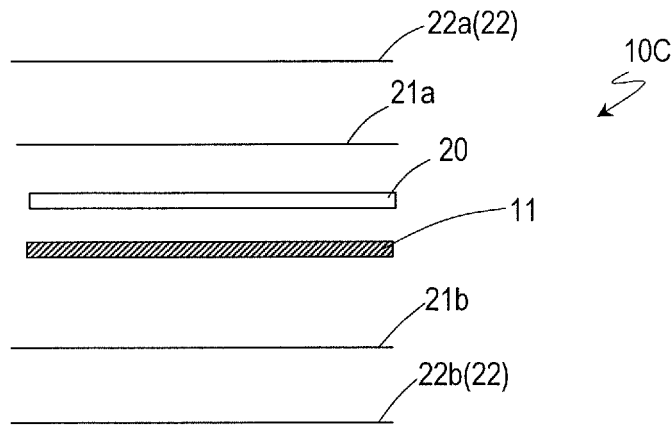

With reference to FIG. 1(a) to FIG. 1(c), the constructions of optical elements 10A, 10B, and 10C according to embodiments of the present invention will be described. FIG. 1(a) to FIG. 1(c) are schematic cross-sectional views showing the constructions of the optical elements 10A, 10B, and 10C. Any common constituent element will be denoted by the same reference numeral, thus avoiding redundancy of explanation.

The optical element 10A shown in FIG. 1(a) includes: a reflective imaging element 11; a first polarizer 22a disposed on a light-outgoing side of the reflective imaging element 11; a first phase difference plate 21a disposed between the reflective imaging element 11 and the first polarizer 22a; and a transparent substrate 20 which is, for example, disposed between the reflective imaging element 11 and the first phase difference plate 21a.

The optical element 10A may further include an antireflection film on a light-outgoing side of the reflective imaging element 11. The first polarizer 22a may be disposed between the antireflection film and the first phase difference plate 21a, for example. The antireflection film may be an antireflection film having a moth-eye structure which is disclosed in International Publication No. 2006/059686, for example.

The transparent substrate 20 may be disposed on the outermost surface of the optical element 10A, for example. Alternatively, the transparent substrate 20 may be disposed on a light-incident side of the reflective imaging element 11. A transparent substrate 20 may be disposed on each of the light-incident side and the light-outgoing side.

The first phase difference plate 21a may include a λ/4 plate, and further include a λ/2 plate. Alternatively, the first phase difference plate 21a may include a uniaxial optical compensation element. The first phase difference plate 21a may include a biaxial optical compensation element. The optical element 10A is able to prevent stray light not contributing to image formation from being mixed in the light contributing to image formation in the case where light striking the optical element 10A is circularly polarized light.

The optical element 10B shown in FIG. 1(b) further includes a second phase difference plate 21b which is disposed on the light-incident side of the optical element 10A. The optical element 10B is able to prevent stray light not contributing to image formation from being mixed in the light contributing to image formation in the case where light striking the optical element 10B is linearly polarized light.

The second phase difference plate 21b includes a λ/4 plate. At least one of the first and second phase difference plates 21a and 21b may include a λ/2 plate, or include a uniaxial optical compensation element. At least one of the first and second phase difference plates 21a and 21b may include a biaxial optical compensation element.

The transparent substrate 20 may be disposed between the reflective imaging element 11 and the second phase difference plate 21b. A transparent substrate 20 may be disposed between the reflective imaging element 11 and the first phase difference plate 21a, and also between the reflective imaging element 11 and the second phase difference plate 21b.

The optical element 10C shown in FIG. 1(c) further includes a second polarizer 22b which is disposed on the light-incident side of the optical element 10B. The second phase difference plate 21b is disposed between the second polarizer 22b and the reflective imaging element 11. The first polarizer 22a and the second polarizer 22b are disposed so that, when the first polarizer 22a and the second polarizer 22b are viewed from a normal direction of the light-outgoing side or the light-incident side of the optical element 10C, an absorption axis of the first polarizer 22a and an absorption axis of the second polarizer 22b are essentially parallel or essentially orthogonal. Preferably, the first polarizer 22a and the second polarizer 22b are disposed so that, when the first polarizer 22a and the second polarizer 22b are viewed from a light direction in which light from an object goes out from the optical element 10C (viewing direction V of the aerial image (see FIG. 6)), or from a light direction in which light from the object strikes the optical element 10C, the absorption axis of the first polarizer 22a and the absorption axis of the second polarizer 22b are essentially parallel or essentially orthogonal. Irrespectively of the polarization state of the light striking the optical element 10C, even in the case of unpolarized light, the optical element 10C is able to prevent stray light not contributing to image formation from being mixed in the light contributing to image formation.

With the above-described optical elements 10A, 10B, and 10C (which hereinafter may be referred to as the optical element 10), it is possible to prevent stray light not contributing to image formation from being mixed in the light contributing to image formation, whereby visual recognition of the aerial image is improved.

The reflective imaging element 11 is a reflective imaging element which is disclosed in Patent Document 1 or 6, for example. Light incident on the reflective imaging element 11 is reflected an even number of times (e.g., twice) by e.g. two mutually-orthogonal specular elements 14 and 15 included in the reflective imaging element 11, whereby an image of an object is allowed to form in the air. In the case where the reflective imaging element 11 has hollow holes, such holes may be filled with a transparent member. The transparent member is preferably composed of a material having an isotropic refractive index.

The reflective imaging element 11 is very thin and therefore is likely to break. Therefore, the transparent substrate 20 serves to reinforce the reflective imaging element 11. Moreover, foreign matter such as dust is prevented from adhering to the specular elements and the like. It is preferable that the reflective imaging element 11 is interposed between transparent substrates 20. Preferably, the transparent substrate(s) 20 at least does not introduce any phase difference on the optical path of light contributing to image formation, i.e., its refractive index is isotropic.

Next, the actions and effects of the optical element 10C will be specifically described.

Figure 2:
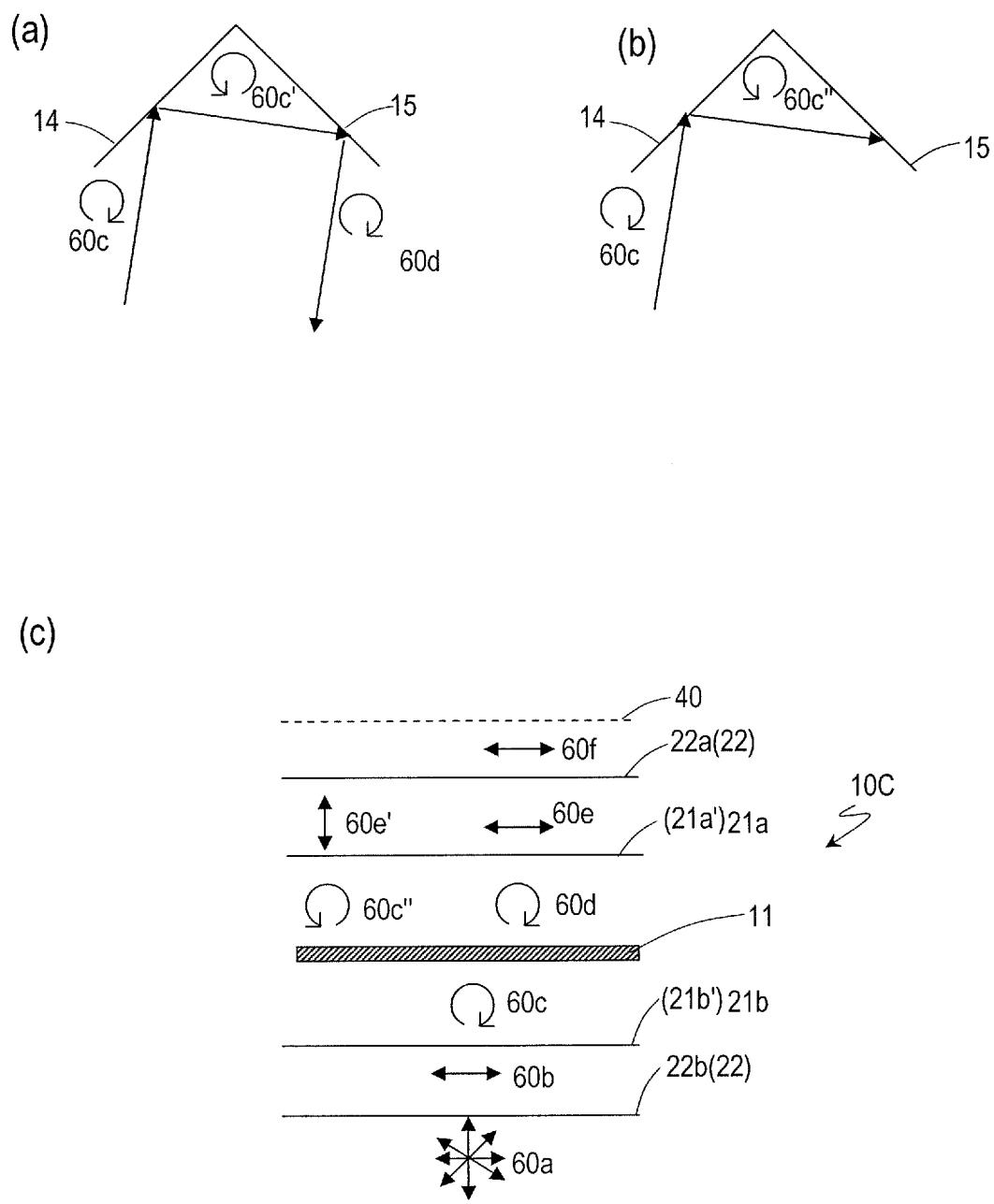
[FIG. 2] (a) and (b) are schematic upper plan views and diagrams showing a light path around specular elements 14 and 15; (c) is a schematic cross-sectional view and diagram showing a light path in the optical element 10C.

FIG. 2(a) is a schematic upper plan view of the two specular elements 14 and 15 for explaining light contributing to image formation. FIG. 2(b) is a schematic upper plan view of the two specular elements 14 and 15 for explaining stray light not contributing to image formation. FIG. 2(c) is a schematic cross-sectional view of the optical element 10C for explaining light striking the optical element 10C. In FIG. 2(c), the transparent substrate 20 is omitted for conciseness of explanation.

As shown in FIG. 2(a), when e.g. right circularly polarized light (or elliptically polarized light) 60c is incident on the reflective imaging element 11, it is reflected by the specular element 14 (or 15), this reflected light becoming left circularly polarized light (or elliptically polarized light) 60c'. The left circularly polarized light (or elliptically polarized light) 60c' is reflected by the other specular element 15 (or 14), this reflected light becoming right circularly polarized light (or elliptically polarized light) 60d, which goes out from the reflective imaging element 11 and forms an image in the air.

On the other hand, as shown in FIG. 2(b), when e.g. right circularly polarized light (or elliptically polarized light) 60c is incident on the reflective imaging element 11, and is reflected by the specular element 14 (or 15) an odd number of times (e.g., once), the light going out from the reflective imaging element 11 is left circularly polarized light (or elliptically polarized light) 60c'', which is not right circularly polarized light (or elliptically polarized light). The light 60c'' which is reflected an odd number of times and goes out from the reflective imaging element 11 is stray light not contributing to image formation. As this stray light mixes with the light 60d contributing to image formation (see FIG. 2(a)), visual recognition of the aerial image is deteriorated.

As shown in FIG. 2(c), the outgoing light 60d containing e.g. right circularly polarized light (or elliptically polarized light) which has been reflected an even number of times (e.g., twice) by the two specular elements 14 and 15 becomes linearly polarized light 60e through a λ/4 plate 21' which is included in the first phase difference plate 21a. The linearly polarized light 60e is transmitted through the first polarizer 22a, which is disposed so that the linearly polarized light 60e is transmitted therethrough, and forms an aerial image at a position 40 of plane of symmetry with respect to the optical element 10C. On the other hand, the outgoing light 60c'' containing e.g. left circularly polarized light (or elliptically polarized light) which has been reflected an odd number of times (e.g., once) becomes linearly polarized light 60e' through the λ/4 plate 21a' included in the first phase difference plate 21a. The polarization direction of the linearly polarized light 60e' differs by 90° from the polarization direction of the linearly polarized light 60e, and therefore is absorbed by the first polarizer 22a.

In other words, by utilizing the differing characteristics between the light which has been reflected an even number of times and the light which has been reflected an odd number of times in the reflective imaging element 11 (e.g., the polarization direction of the linearly polarized light differing by 90°), the optical element 10C allows light contributing to image formation (e.g., light which has been reflected an even number of times) to go out from the light-outgoing side of the optical element 10C, while being able to prevent stray light not contributing to image formation (e.g., light which has been reflected an odd number of times) from going out from the light-outgoing side of the optical element 10C.

Since the optical element 10C includes the second polarizer 22b, the optical element 10C is able to convert unpolarized light 60a into linearly polarized light 60b. The linearly polarized light 60b is converted by the second phase difference plate 21b into circularly polarized light 60c. Therefore, even if the light striking the optical element 10C is unpolarized light 60a, it can still be used. In the case where the light striking the optical element is circularly polarized light (or elliptically polarized light), the second phase difference plate 21b and the second polarizer 22b are not needed and thus the optical element 10A is to be used; in the case where the light striking the optical element is linearly polarized light, the second polarizer 22b is not needed so that the optical element 10B is to be used. In these cases, the optical elements 10A and 10B provide the effect of preventing stray light not contributing to image formation from going out of the light-outgoing side of the optical elements 10A and 10B, respectively, as described above.

Thus, by adopting a construction which prevents stray light not contributing to image formation from going out from the light-outgoing side of the optical element 10, the aerial image attains an improved visual recognition.

Next, the relative positioning between the first polarizer 22a and the λ/4 plates 21a' and 21b' in the case where the first phase difference plate 21a and the second phase plate 21b are respectively composed only of the λ/4 plates 21a' and 21b' will be described. The λ/4 plates 21a' and 21b' are formed from a norbornene-type resin, for example.

Figure 3:
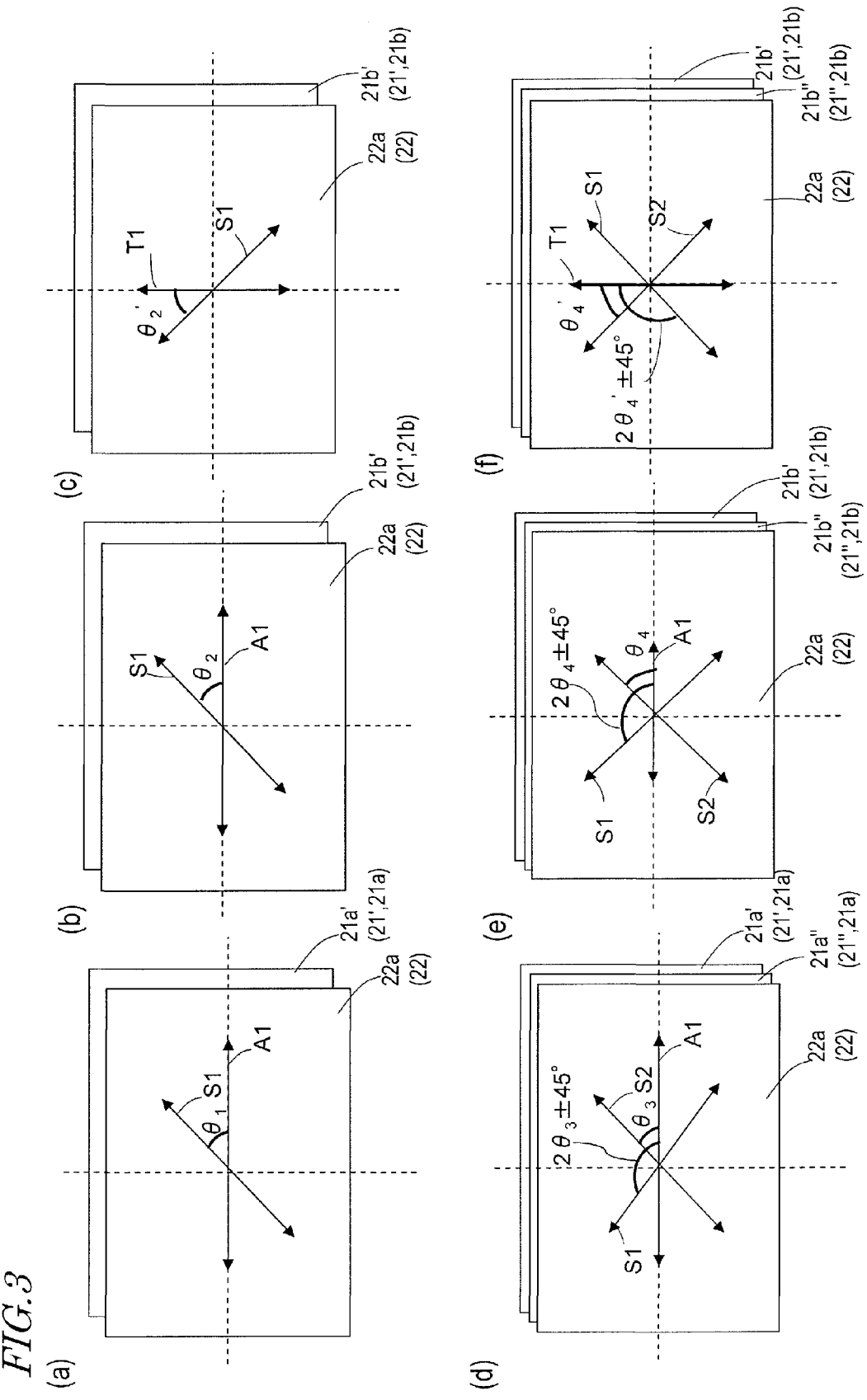
[FIG. 3] (a) to (c) are diagrams for describing relative positioning of a polarizer 22 and a λ/4 plate 21'; and (d) to (f) are diagrams for describing relative positioning of a polarizer 22, a λ/2 plate 21", and a λ/4 plate 21'.

FIG. 3(a) is a schematic perspective view for describing relative positioning of the first polarizer 22a and the λ/4 plate 21a'. The λ/4 plate 21a' is disposed between the first polarizer 22a and the reflective imaging element 11 (not shown). The angle between an absorption axis A1 of the first polarizer 22a and a slow axis S1 of the λ/4 plate 21a' is defined as an angle $\theta_1$; and, when viewing the optical element 10 from the normal direction of the light-outgoing side of the optical element 10, or from a light direction in which light from the object goes out from the optical element 10, the positive direction is defined counterclockwise, and the negative direction clockwise. $\theta_1$ is a value satisfying the relationship $-90° \leq \theta_1 \leq 90°$. When $\theta_1 = 45°$, light entering the first polarizer 22a and going out from the λ/4 plate 21a' is left circularly polarized light. Conversely, the light which goes out as a result of left circularly polarized light entering the λ/4 plate 21a' and going through the first polarizer 22a is linearly polarized light. When $\theta_1 = -45°$, the light entering the first polarizer 22a and going out from the λ/4 plate 21a' is right circularly polarized light. Conversely, the light which goes out as a result of right circularly polarized light entering the λ/4 plate 21a' and going through the first polarizer 22a is linearly polarized light. Therefore, the first polarizer 22a and the λ/4 plate 21a' are disposed so that, when viewing the optical element 10 from the normal direction of the light-outgoing side of the optical element 10 (not shown), $\theta_1$ is essentially $(45+x_1)°$ (e.g., 39°) or essentially $-(45+x_1)°$. Preferably, the first polarizer 22a and the λ/4 plate 21' are disposed so that, when viewing the optical element 10 from a direction in which light from the object goes out from the optical element 10 (viewing direction V of the aerial image (see FIG. 6)), $\theta_1$ is $(45+x_1)°$ or $-(45+x_1)°$. $x_1$ is to be appropriately determined within a range of $-8 \leq x_1 \leq 10$ from the viewing direction V of the aerial image. A simulation study conducted by the inventors indicated that, if x satisfies $-8 > x_1$ or $x_1 > 10$, the aerial image has low visual recognition under the influence of external light when the aerial image is viewed from the viewing direction V.

FIG. 3(b) is a schematic perspective view for describing relative positioning of the first polarizer 22a and the λ/4 plate 21b' in the case where the absorption axis of the first polarizer 22a and the absorption axis of the second polarizer (or the polarizer at the display-surface side of the display device) (neither is shown) are disposed essentially parallel. The first polarizer 22a is disposed on the light-outgoing side of the reflective imaging element 11 (not shown), whereas the λ/4 plate 21b' is disposed on the light-incident side of the reflective imaging element 11 (not shown). The angle between the absorption axis A1 of the first polarizer 22a and a slow axis S1 of the λ/4 plate 21b' is defined as an angle $\theta_2$; and, when viewing the optical element 10B, 10C from the normal direction of the light-outgoing side of the optical element 10B, 10C (not shown), or from a light direction in which light from the object goes out from the optical element 10B, 10C, the positive direction is defined counterclockwise, and the negative direction clockwise. $\theta_2$ is a value satisfying the relationship $-90° \leq \theta_2 \leq 90°$. It is preferable to dispose the first polarizer 22a and the λ/4 plate 21b' so that $\theta_2$ is of the relationship $\theta_2 = -\theta_1$. Specifically, when $\theta_1 = 45°$, for example, $\theta_2 = -45°$; and when $\theta_1 = -45°$, for example, $\theta_2 = 45°$. Therefore, since the first polarizer 22a and the λ/4 plate 21a' are preferably disposed so that $\theta_1 = (45+x_1)°$ (e.g., 39°) or $-(45+x_1)°$ as described above, the first polarizer 22a and the λ/4 plate 21b' are disposed so that, as viewed from the normal direction of the light-outgoing side of the optical element 10, $\theta_2$ is essentially $-(45+x_1)°$ or essentially $(45+x_1)°$. Preferably, the first polarizer 22a and the λ/4 plate 21b' are disposed so that, when viewing the optical element 10B, 10C in a light direction in which light from the object goes out from the optical element 10, $\theta_2$ is $-(45+x_1)°$ (e.g., -39°), or $(45+x_1)°$.

FIG. 3(c) is a schematic perspective view for describing relative positioning of the first polarizer 22a and the λ/4 plate 21b' in the case where the absorption axis of the first polarizer 22a and the absorption axis of the second polarizer (or the polarizer at the display-surface side of the display device) (neither is shown) are disposed essentially orthogonal. The first polarizer 22a is disposed on the light-outgoing side of the reflective imaging element 11 (not shown), whereas the λ/4 plate 21b' is disposed on the light-incident side of the reflective imaging element 11 (not shown). The angle between a transmission axis T1 of the first polarizer 22a and a slow axis S1 of the λ/4 plate 21b' is defined as an angle $\theta_2$'; and, when viewing the optical element 10B, 10C from the normal direction of the light-outgoing side of the optical element 10B, 10C (not shown), or from a light direction in which light from the object goes out from the optical element 10B, 10C, the positive direction is defined counterclockwise, and the negative direction clockwise. $\theta_2$' is a value satisfying the relationship $-90° \leq \theta_2' \leq 90°$. The first polarizer 22a and the λ/4 plate 21b' are disposed so that $\theta_2$' satisfies $\theta_2' = \pm(45+x_2)°$, similarly to $\theta_1$. Moreover, they are disposed so that $\theta_2' = -(45+x_2)°$ when $\theta_1 = (45+x_1)°$, and $\theta_2' = (45+x_2)°$ when $\theta_1 = -(45+x_1)°$, in its relationship with $\theta_1$. Now, when $x_1$ has a positive value, $x_2$ takes a negative value; when $x_1$ has a negative value, $x_2$ takes a positive value. Specifically, $\theta_2' = -54°(x_2 = +10)$ when $\theta_1 = 37°(x_1 = -8)$, for example. The value of $x_2$ is to be appropriately determined within a range of $-8 \leq x_2 \leq 10$ from the viewing direction V of the aerial image. A simulation study conducted by the inventors indicated that, if $x_2$ satisfies $-8 > x_2$ or $x_2 > 10$, the aerial image has low visual recognition under the influence of external light when the aerial image is viewed from the viewing direction V.

By thus disposing the λ/4 plate 21a', the λ/4 plate 21b', the first polarizer 22a, and the second polarizer 22b (or the polarizer at the display-surface side of the display device), an aerial image with high visual recognition is obtained.

Next, with respect to the case where the first phase difference plate 21a and the second phase plate 21b respectively include λ/2 plates 21a" and 21b", the relative positioning of the first polarizer 22a, the λ/4 plates 21a' and 21b', and the λ/2 plates 21a" and 21b" will be described. The λ/4 plates 21a' and 21b' and the λ/2 plates 21a" and 21b" are formed from a norbornene-type resin, for example.

FIG. 3(d) is a schematic perspective view for describing relative positioning of the λ/4 plate 21a' and λ/2 plate 21a" included in the first phase difference plate 21a and the first polarizer 22a. The λ/2 plate 21a" is disposed between the first polarizer 22a and the λ/4 plate 21a', such that the λ/4 plate 21a' lies closer to the reflective imaging element 11 (not shown). Given an absorption axis A1 of the first polarizer 22a, a slow axis S1 of the λ/4 plate 21a', and a slow axis S2 of the λ/2 plate 21a", the angle between the absorption axis A1 of the first polarizer 22a and the slow axis S2 of the λ/2 plate 21a" is defined as an angle $\theta_3$; and, when viewing the optical element 10 from the normal direction of the light-outgoing side of the optical element 10, or a light direction in which light from the object goes out from the optical element, the positive direction is defined counterclockwise, and the negative direction clockwise; and a range $-90° \leq \theta_3 \leq 90°$ is assumed. When viewing the optical element 10 from the normal direction of the light-outgoing side of the optical element 10, if the angle $|\theta_3|$ (where $|Q|$ represents an absolute value of Q; this same notation will be used hereinafter), is approximately 15° or 75°, influences of the wavelength dependence of the refractive index of the phase difference plate in the visible light region (no less than 400 nm and no more than 800 nm) can be reduced. Therefore, variation in light reflectance associated with light wavelength differences in the visible light region becomes smaller, whereby coloring of the aerial image can be suppressed. Thus, by employing the λ/2 plate together with the λ/4 plate, it becomes possible to cancel out the wavelength dispersion of refractive indices between the λ/4 plate and the λ/2 plate. Although the optimum angle of $|\theta_3|$ is herein approximately 15° or 75° because of using wave plates that are made of a norbornene-type resin, the optimum $\theta_3$ value would differ in the case where a different resin is used for making the wave plates, because a different wavelength dispersion of refractive indices would result. The optimum $\theta_3$ value can be obtained through simulations. The λ/4 plate 21a' is disposed so that, when viewing the optical element 10 from the normal direction of the light-outgoing side of the optical element 10, the angle between the absorption axis A1 and the slow axis S1 is essentially) $\pm((2|\theta_3|+45°)+y_1)°$. The λ/4 plate 21a' is preferably disposed so that, when viewing the optical element 10 from a direction in which light from the object goes out from the optical element 10 (viewing direction V of the aerial image (see FIG. 6)), the angle between the absorption axis A1 and the slow axis S1 is $\pm((2|\theta_3|+45°)+y_1)°$. Herein, the λ/4 plate 21a' is disposed so that the angle between the absorption axis A1 and the slow axis S1 is $((2|\theta_3|+45°)+y_1)°$ when $\theta_3 \geq 0°$ is satisfied, and that the angle between the absorption axis A1 and the slow axis S1 is $-((2|\theta_3|+45°)+y_1)°$ when $\theta_3 \leq 0°$ is satisfied. $y_1$ is a value satisfying the relationship $-31 \leq y_1 \leq 29$. A simulation study conducted by the inventors indicated that, if $y_1$ satisfies $-31 > y_1$ or $y_1 > 29$, the aerial image has low visual recognition under the influence of external light when the aerial image is viewed from the viewing direction V.

FIG. 3(e) is a schematic perspective view for describing relative positioning of the λ/4 plate 21b' and the λ/2 plate 21b" included in the second phase difference plate 21b and the first polarizer 22a in the case where the absorption axis of the first polarizer 22a and the absorption axis of the second polarizer (or the polarizer at the display-surface side of the display device) are disposed essentially parallel. The first polarizer 22a is disposed on the light-outgoing side of the reflective imaging element 11 (not shown). The λ/4 plate 21b' and the λ/2 plate 21b" are disposed on the light-incident side of the reflective imaging element 11. The λ/2 plate 21b" is disposed between the reflective imaging element 11 and the λ/4 plate 21b', such that the λ/4 plate 21b' lies farther away from the reflective imaging element 11 than does the λ/2 plate 21b". Given an absorption axis A1 of the first polarizer 22a, a slow axis S1 of the λ/4 plate 21b', and a slow axis S2 of the λ/2 plate 21b", the angle between the absorption axis A1 of the first polarizer 22a and the slow axis S2 of the λ/2 plate 21b" is defined as an angle $\theta_4$; the positive direction is defined counterclockwise, and the negative direction clockwise; and a range $-90° \leq \theta_4 \leq 90°$ is assumed. When viewing the optical element 10B, 10C from the normal direction of the light-outgoing side of the optical element 10B, 10C (not shown), if the angle $|\theta_4|$ is approximately 15° or 75°, influences of the wavelength dependence of the refractive index of the phase difference plate in the visible light region can be reduced. Therefore, variation in light reflectance associated with light wavelength differences in the visible light region becomes smaller, whereby coloring of the aerial image can be suppressed. Thus, by employing the λ/2 plate together with the λ/4 plate, it becomes possible to cancel out the wavelength dispersion of refractive indices between the λ/4 plate and the λ/2 plate. Although the optimum angle of $|\theta_4|$ is herein approximately 15° or 75° because of using wave plates that are made of a norbornene-type resin, the optimum $|\theta_4|$ value would differ in the case where a different resin is used for making the wave plates, because a different wavelength dispersion of refractive indices would result. The optimum $|\theta_4|$ value can be obtained through simulations. The λ/4 plate 21b' is disposed so that, when viewing the optical element 10B, 10C from the normal direction of the light-outgoing side of the optical element 10B, 10C, the angle between the absorption axis A1 and the slow axis S1 is essentially $\pm((2|\theta_4|+45°)+y_1)°$. The λ/4 plate 21b' is preferably disposed so that, when viewing the optical element 10B, 10C from a light direction in which light from the object goes out from the optical element 10B, 10C, the angle between the absorption axis A1 and the slow axis S1 is $\pm((2|\theta_4|+45°)+y_1)°$. Herein, the λ/4 plate 21b' is disposed so that the angle between the absorption axis A1 and the slow axis S1 is $((2|\theta_4|+45°)+y_1)°$ when $\theta_4 \leq 0°$ is satisfied, and that the angle between the absorption axis A1 and the slow axis S1 is $-((2|\theta_4|+45°)+y_1)°$ when $\theta_4 \leq 0°$ is satisfied. In its relationship with $\theta_3$, it is preferable that $\theta_4$ is of the relationship $\theta_4 = -\theta_3$.

FIG. 3(f) is a schematic perspective view for describing relative positioning of the λ/4 plate 21b' and the λ/2 plate 21b" included in the second phase difference plate 21b and the first polarizer 22a in the case where the absorption axis of the first polarizer 22a and the absorption axis of the second polarizer (or the polarizer at the display-surface side of the display device) are disposed essentially orthogonal. The first polarizer 22a is disposed on the light-outgoing side of the reflective imaging element 11 (not shown). The λ/4 plate 21b' and the λ/2 plate 21b" are disposed on the light-incident side of the reflective imaging element 11. The λ/2 plate 21b" is disposed between the reflective imaging element 11 and the λ/4 plate 21b', such that the λ/4 plate 21b' lies farther away from the reflective imaging element 11 than does the λ/2 plate 21b". Given a transmission axis T1 of the first polarizer 22a, a slow axis S1 of the λ/4 plate 21b', and a slow axis S2 of the λ/2 plate 21$b$", the angle between the transmission axis T1 of the first polarizer 22$a$ and the slow axis S2 of the λ/2 plate 21$b$" is defined as an angle θ$_4$'; the positive direction is defined counterclockwise, and the negative direction clockwise; and a range −90°≤θ$_4$≤90° is assumed. When viewing the optical element 10B, 10C from the normal direction of the light-outgoing side of the optical element 10B, 10C (not shown), if the angle |θ$_4$'| is approximately 15° or 75°, influences of the wavelength dependence of the refractive index of the phase difference plate in the visible light region can be reduced. Therefore, variation in light reflectance associated with light wavelength differences in the visible light region becomes smaller, whereby coloring of the aerial image can be suppressed. Thus, by employing the λ/2 plate together with the λ/4 plate, it becomes possible to cancel out the wavelength dispersion of refractive indices between the λ/4 plate and the λ/2 plate. Although the optimum angle of |θ$_4$'| is herein approximately 15° or 75° because of using wave plates that are made of a norbornene-type resin, the optimum |θ$_4$'| value would differ in the case where a different resin is used for making the wave plates, because a different wavelength dispersion of refractive indices would result. The optimum |θ$_4$'| value can be obtained through simulations. The λ/4 plate 21$b$' is disposed so that, when viewing the optical element 10B, 10C from the normal direction of the light-outgoing side of the optical element 10B, 10C, the angle between the transmission axis T1 and the slow axis S1 is essentially ±((2|θ$_4$'|+45°)+y$_2$)°. The λ/4 plate 21$b$' is preferably disposed so that, when viewing the optical element 10B, 10C from a light direction in which light from the object goes out from the optical element 10B, 10C, the angle between the transmission axis T1 and the slow axis S1 is ±((2|θ$_4$'|+45°)+y$_2$)°. Herein, the λ/4 plate 21$b$' is disposed so that the angle between the transmission axis T1 and the slow axis S1 is ((2|θ$_4$'|+45°)+y$_2$)° when θ$_4$'≥0° is satisfied, and that the angle between the transmission axis T1 and the slow axis S1 is −((2|θ$_4$'|+45°)+y$_2$)° when θ$_4$'≤0° is satisfied. y$_2$ is a value satisfying the relationship −31≤y$_2$≤29. A simulation study conducted by the inventors indicated that, if y$_2$ satisfies the relationship of −31>y$_2$ or y$_2$>29, the aerial image has low visual recognition under the influence of external light when the aerial image is viewed from the viewing direction V. Moreover, in its relationship with θ$_3$, it is preferable that θ$_4$' is of the relationship θ$_4$'=−θ$_3$. When the y$_1$ has a positive value, y$_2$ has a negative value; when y$_1$ has a negative value, y$_2$ has a positive value. The values of y$_1$ and y$_2$ are to be appropriately determined from the viewing direction V (see FIGS. 6), θ$_1$ to θ$_4$ and θ$_4$', and from the optical characteristics of the λ/4 plate and the λ/2 plate.

With such positioning, stray light is suppressed, and an aerial image with high visual recognition is obtained. Specifically, when using a λ/4 plate 21' that is produced with a phase difference satisfying λ/4 with respect to light of a wavelength of 550 nm, at which the luminous efficacy is highest, the phase difference will be deviated from λ/4 as the light wavelength deviates from 550 nm. As a result, a phenomenon of coloration of the aerial image occurs. When the polarizer 22, the λ/4 plate 21', and the λ/2 plate 21" are disposed so as to have the aforementioned relationships, the influences of the wavelength dispersion of refractive indices of each of the phase plates can be cancelled out, so that the λ/4 condition is satisfied across the entirety of visible light. Moreover, a plurality of λ/2 plates 21" may be disposed. In this case, the relationship between the absorption axis A1 or the transmission axis T1 of the polarizer 22 and the slow axis S2 of the λ/2 plate 21" may be separately designed by a known method. Moreover, instead of a λ/2 plate 21", a λ/4 plate having reverse wavelength dispersion characteristics with respect to the refractive index of the λ/4 plate 21' may be disposed. Furthermore, instead of a λ/2 plate 21", a phase difference plate having different wavelength dispersion from the refractive index of the λ/4 plate 21' may be disposed. In this case, they are preferably disposed so that the slow axis of the λ/4 plate 21' and the slow axis of the phase difference plate are essentially parallel or essentially orthogonal.

When two polarizers 22 are used with the reflective imaging element 11 interposed therebetween, it is preferable that the first polarizer 22$a$ and the second polarizer 22$b$ are disposed so that, as viewed from the normal direction of the polarizer 22, the absorption axes of the two, i.e., the first polarizer 22$a$ and second polarizer 22$b$, are essentially parallel or essentially orthogonal to each other. It is more preferable that the polarizers 22$a$ and 22$b$ are disposed so that, when viewing the first polarizer 22$a$ and the second polarizer 22$b$ from a light direction in which light from the object goes out from the optical element 10C, or a light direction in which light from the object strikes the optical element 10C, the absorption axes of the two polarizers 22$a$ and 22$b$ are essentially parallel or essentially orthogonal to each other. With such positioning, the visual recognition of the aerial image can be improved.

With an optical compensation element 23, the viewing angle which provides a high visual recognition of the aerial image becomes large. The optical compensation element 23 may be obtained by, for example, drawing a polymer film so that the polymer chains within the film plane (corresponding to the XY plane of the optical compensation element 23 in FIG. 4($b$)) become aligned and that the polymer film acquires optical anisotropy. Alternatively, the optical compensation element 23 may be a liquid crystal cell which is obtained by, on a substrate such as a glass substrate or a known phase difference plate, forming a vertical alignment film for aligning liquid crystal molecules perpendicularly with respect to the substrate, and the substrate then being subjected to a rubbing treatment, aligning liquid crystalline monomers on the substrate, and polymerizing the liquid crystalline monomers with e.g. ultraviolet, so that the liquid crystal cell has the function of a positive C-plate, for example.

Next, the optical characteristics of the λ/4 plate 21', the λ/2 plate 21", and the optical compensation element 23 (uniaxial or biaxial optical compensation element 23$a$, 23$b$) will be described.

Figure 4:
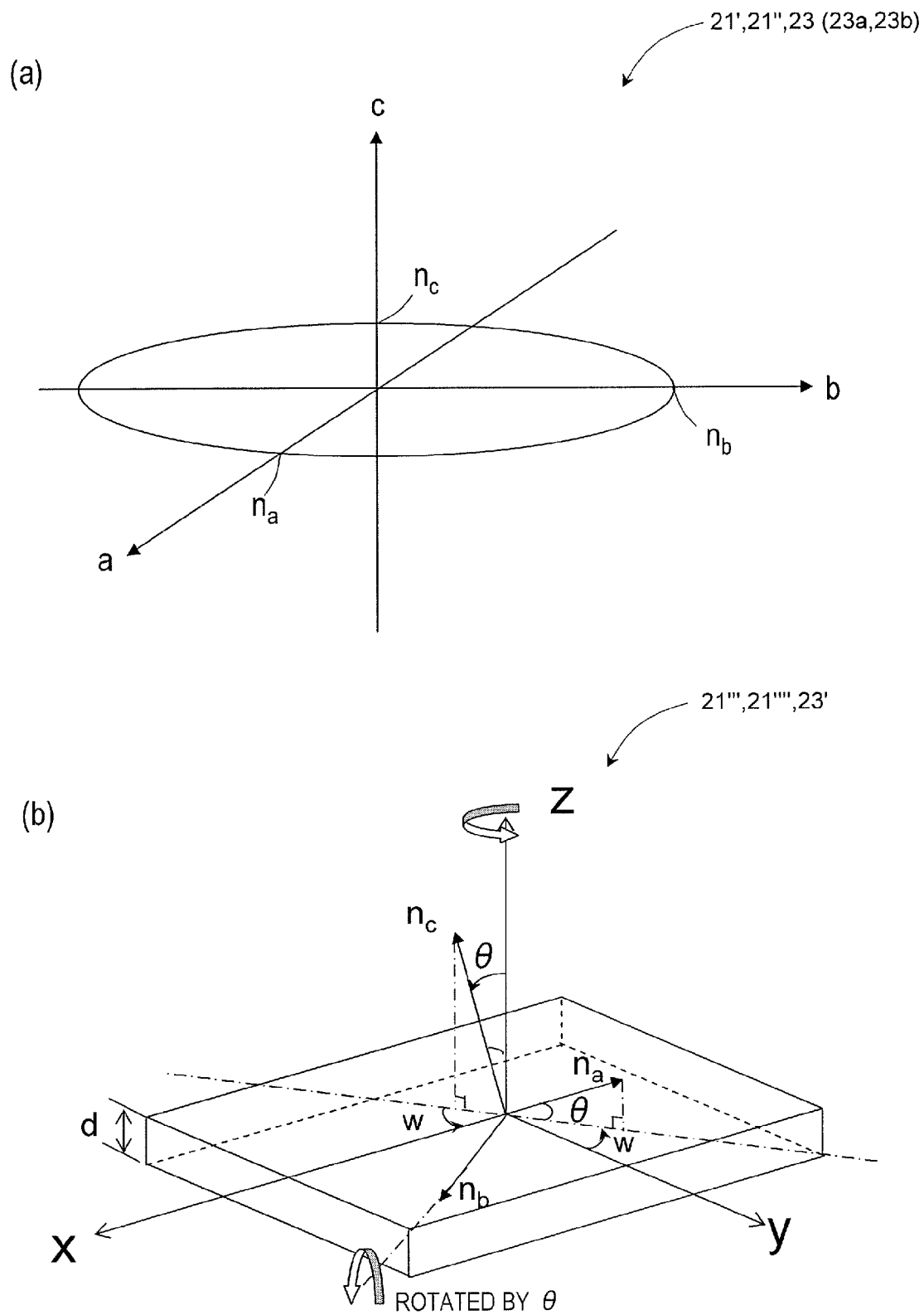
[FIG. 4] (a) is a schematic diagram showing an index ellipsoid of each of a λ/2 plate 21", a λ/4 plate 21', and an optical compensation element 23; and (b) is a diagram showing relative positioning of a λ/2 plate 21"", a λ/4 plate 21''', and an optical compensation element 23' and a respective index ellipsoid of the λ/2 plate 21"", the λ/4 plate 21''', or the optical compensation element 23'.

FIG. 4($a$) is a diagram showing the index ellipsoid of the λ/4 plate 21', the λ/2 plate 21", the optical compensation element 23 (uniaxial or biaxial optical compensation element 23$a$, 23$b$), and the first phase difference plate 21$a$ and the second phase difference plate 21$b$. As shown in FIG. 4($a$), principal axes of the index ellipsoid are designated the a axis, the b axis, and the c axis; and a principal refractive index along the a axis is n$_a$, a principal refractive index along the b axis is n$_b$, and a principal refractive index along the c axis is n$_c$, each with respect to light having a wavelength of 550 nm.

As for the λ/4 plate 21', the c axis of its index ellipsoid is substantially parallel to the normal direction of a principal face of the λ/4 plate 21', and the directions of its a axis and b axis are within the plane of the λ/4 plate 21', such that the magnitudes of the principal refractive indices satisfy the relationship n$_a$≥n$_b$. Assuming that the magnitudes of the respective principal refractive indices are of the relationship N$_z$=(n$_a$−n$_c$)/(n$_a$−n$_b$), the λ/4 plate 21' preferably satisfies the relationship 0.1≤N$_z$≤1, and more preferably satisfies the relationship N$_z$=0.5. Assuming an in-plane phase difference Re (Re=(n$_a$−n$_b$)*d, (d: thickness of the λ/4 plate 21')), it is preferable that the relationship 100 nm≤Re≤175 nm is satisfied with respect to incident light having a wavelength of 550 nm.

As for the λ/2 plate 21", the c axis of its index ellipsoid is substantially parallel to the normal direction of a principal face of the λ/2 plate 21", and the directions of its a axis and b axis are in the plane of the λ/2 plate 21", such that the magnitudes of the principal refractive indices satisfy the relationship $n_a \le n_b$. The λ/2 plate 21" preferably satisfies the relationship $0.1 \le N_z \le 1$, and more preferably satisfies the relationship $N_z = 0.5$. Assuming an in-plane phase difference Re (Re=$(n_a-n_b)$*d, (d: thickness of the λ/2 plate 21")), it is preferable that the relationship 200 nm≤Re≤250 nm is satisfied with respect to incident light having a wavelength of 550 nm.

Since the λ/4 plate 21' and the λ/2 plate 21" have the aforementioned relationship, the λ/4 plate 21' and the λ/2 plate 21" constitute a phase difference plate which allows for little variation in phase difference in spite of differences in the viewing direction of the aerial image, or the incident direction of light from the object striking the optical element 10. As a result, the viewing angle which provides a high visual recognition of the aerial image can be made large.

As for the uniaxial optical compensation element 23a, the c axis of its index ellipsoid is substantially parallel to the normal direction of a principal face of the uniaxial optical compensation element 23a; the directions of its a axis and b axis are in the plane of the uniaxial optical compensation element 23a; and the magnitudes of the principal refractive indices satisfy the relationship $n_c > n_a = n_b$ (e.g., a positive C-plate) or the relationship $n_c = n_a > n_b$ (e.g., a negative A-plate), preferably.

Moreover, the uniaxial optical compensation element 23a is disposed so that the a axis or the b axis of the uniaxial optical compensation element 23a is essentially parallel to the slow axis of any phase difference plate, other than the uniaxial optical compensation element 23a, that the first phase difference plate 21a (or the second phase difference plate 21b) includes, and $N_z$ of the first phase difference plate 21a (or the second phase difference plate 21b) preferably satisfies the relationship $0.1 \le N_z \le 1$, and more preferably satisfies the relationship $N_z = 0.5$.

Since the respective principal refractive indices have the aforementioned relationship, the uniaxial optical compensation element 23a is a uniaxial optical compensation element which allows for little variation in phase difference in spite of differences in the viewing direction of the aerial image, or the incident direction of light from the object striking the optical element 10. As a result, the viewing angle which provides a high visual recognition of the aerial image can be made large.

As for the biaxial optical compensation element 23b, the c axis of its index ellipsoid is substantially parallel to the normal direction of a principal face of the biaxial optical compensation element 23b; the directions of its a axis and b axis are in the plane of the biaxial optical compensation element; and the magnitudes of the principal refractive indices satisfy the relationship $n_c > n_a > n_b$, preferably.

Moreover, the biaxial optical compensation element 23a is disposed so that the a axis or b axis of the biaxial optical compensation element 23b is essentially parallel to the slow axis of any phase difference plate, other than the biaxial optical compensation element 23b, that the first phase difference plate 21a (or the second phase difference plate 21b) includes, and $N_z$ of the first phase difference plate 21a (or the second phase difference plate 21b) preferably satisfies the relationship $0.1 \le N_z \le 1$, and more preferably satisfies the relationship $N_z = 0.5$.

When the respective principal refractive indices have the aforementioned relationship, the biaxial optical compensation element 23b is a biaxial optical compensation element which allows for little variation in phase difference in spite of differences in the viewing direction of the aerial image, or the incident direction of light from the object striking the optical element 10. As a result, the viewing angle which provides a high visual recognition of the aerial image can be made large.

The above description illustrates that, in the respective index ellipsoids of the λ/4 plate 21', the λ/2 plate 21", and the optical compensation element 23, the c axis is substantially parallel to the respective normal directions of the λ/4 plate 21', the λ/2 plate 21", and the optical compensation element 23, and the a axis and the b axis are in the respective planes of the λ/4 plate 21', the λ/2 plate 21", and the optical compensation element 23. The λ/4 plate 21', the λ/2 plate 21", and the optical compensation element 23 to be used in the present embodiment are not limited to the above-described λ/4 plate 21', λ/2 plate 21", and optical compensation element 23. The c axis of each index ellipsoid may be tilted from the respective z axis (normal direction of the principal face) of the λ/4 plate 21', the λ/2 plate 21", or the optical compensation element 23.

Hereinafter, with reference to FIG. 4(b), a λ/4 plate 21''', a λ/2 plate 21'''', and an optical compensation element 23' (uniaxial or biaxial optical compensation element 23a', 23b') whose respective index ellipsoid has a c axis which is tilted from the z axis of the optical compensation element will be described. FIG. 4(b) is a diagram schematically showing relative positioning of each of the λ/4 plate 21''', the λ/2 plate 21'''', and the optical compensation element 23', and a respective index ellipsoid of the λ/4 plate 21''', the λ/2 plate 21'''', or the optical compensation element 23'.

As shown in FIG. 4(b), an orthogonal coordinate system is defined whose xy plane corresponds to the respective principal faces of the λ/4 plate 21''', the λ/2 plate 21'''', and the optical compensation element 23', and whose z axis direction corresponds to the respective normal directions of the λ/4 plate 21''', the λ/2 plate 21'''', and the optical compensation element 23'. Beginning from the index ellipsoid shown in FIG. 4(a), its a axis, b axis, and c axis coinciding with the x axis, the y axis, and the z axis, the index ellipsoid shown in FIG. 4(b) is obtained through a clockwise rotation by an angle w around the c axis, and then a clockwise rotation by an angle θ around the a axis.

Hereinafter, in the present specification, the aforementioned w (azimuth angle) and θ (tilting angle) will be employed in defining the respective principal axis directions of the λ/4 plate 21''', the λ/2 plate 21'''', and the optical compensation element 23', whose principal axes are tilted.

Preferably, the tilting angle θ (FIG. 4(b)) of the c axis of the respective index ellipsoid of the λ/4 plate 21''', the λ/2 plate 21'''', or the optical compensation element 23' with respect to the normal direction (z axis direction) of the principal face of the phase difference plate or optical compensation element is an incident angle β of the light striking the optical element 10 described above. As used herein, the incident angle β of light striking the optical element 10 is an angle β (0°<β<90°) between the normal direction of the principal face of the optical element 10 and the incident direction of light striking the optical element 10 (see FIG. 6). The incident angle β is also the preferable angle V of viewing the aerial image (see FIG. 6). Similarly, it is preferable that the azimuth in which the c axis of the index ellipsoid of the respective phase difference plate or optical compensation element is tilted is the azimuth of viewing V (see FIG. 6) of the aerial image.

Figure 6:
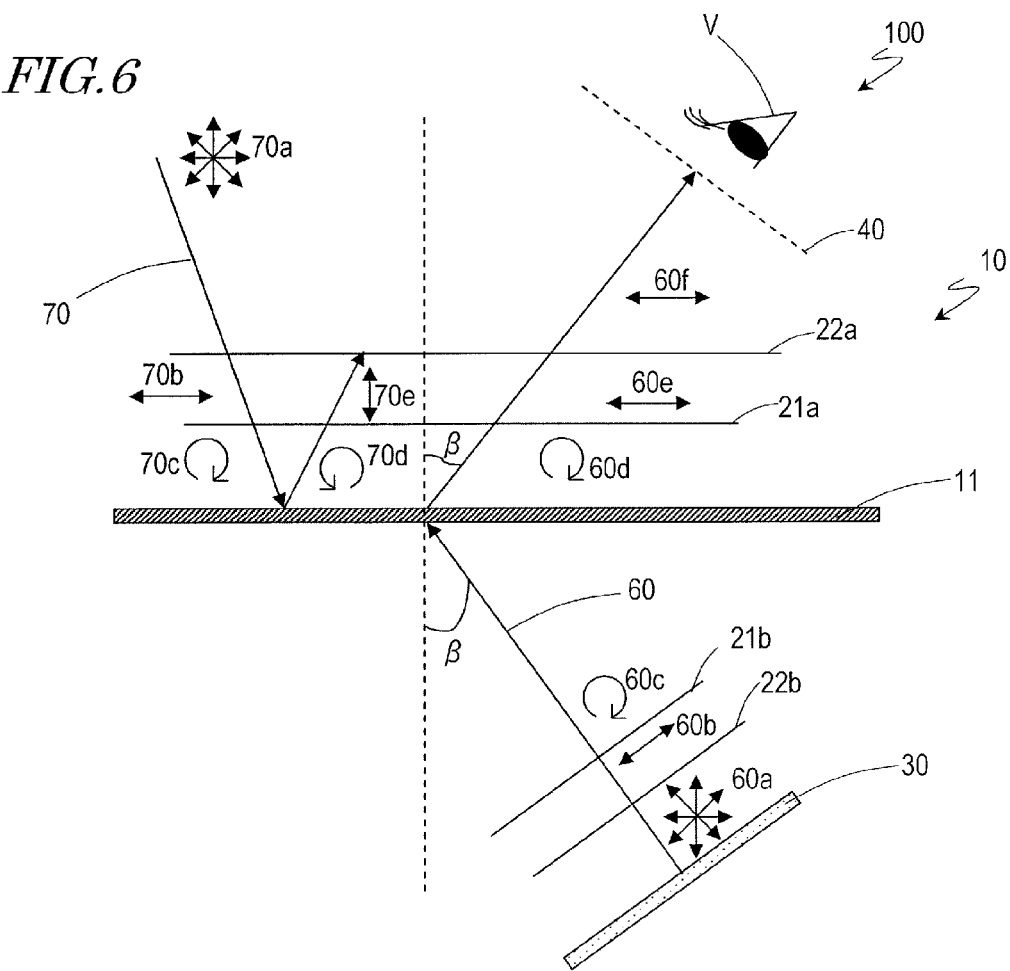
[FIG. 6] A diagram showing the construction of an optical system 100.

The λ/4 plate 21''', the λ/2 plate 21'''', or the optical compensation element 23', whose index ellipsoid has a c axis which is tilted from the z axis of the respective phase difference plate or optical compensation element, allow for a large viewing angle of the aerial image in the viewing direction V (see FIG. 6).

Next, a method of restraining external light from exiting the optical element will be described.

FIG. 5(a) is a diagram showing iso-reflectance contours of external light in the case where a λ/4 phase difference plate which has an in-plane phase difference of 137.5 nm (i.e., a λ/4 value for light having a wavelength of 550 nm) with respect to light having a wavelength of 550 nm, such that $N_z=1$, is used as the optical element 10. FIG. 5(b) shows iso-reflectance contours of external light 70 in the case where a λ/4 phase difference plate which has an in-plane phase difference of 137.5 nm with respect to light having a wavelength of 550 nm, such that $N_z=0.5$, is used as the optical element 10. FIG. 6 is a schematic cross-sectional view showing an optical system 100 having the optical element 10.

The diagrams of FIG. 5(a) and FIG. 5(b) are drawn so that the X direction (X axis) in FIG. 4(b) is at an azimuth angle of 0°, and that a polar angle (angle from the normal at the light-outgoing side of the optical element 10) that is indicated by the outermost circle reads 80°. Any decimal fraction in the figures represents a reflectance of external light 70. A reflectance of external light 70 is obtained by dividing the intensity of incident light, i.e., external light 70, by the intensity of outgoing light, which results from the external light 70 striking the optical element 10 and reflecting at the surface of the reflective imaging element 11, this reflected light going out from the optical element 10. As shown in FIG. 6, the external light 70 enters the optical element 10 at the light-outgoing side (viewer's side) of the optical element 10, reflects an odd number of times (e.g., once) within the optical element 10, and this reflected light goes toward the light-outgoing side of the optical element 10. Therefore, if the reflectance of the external light 70 is high, the aerial image suffers poor visual recognition.

Figure 5:
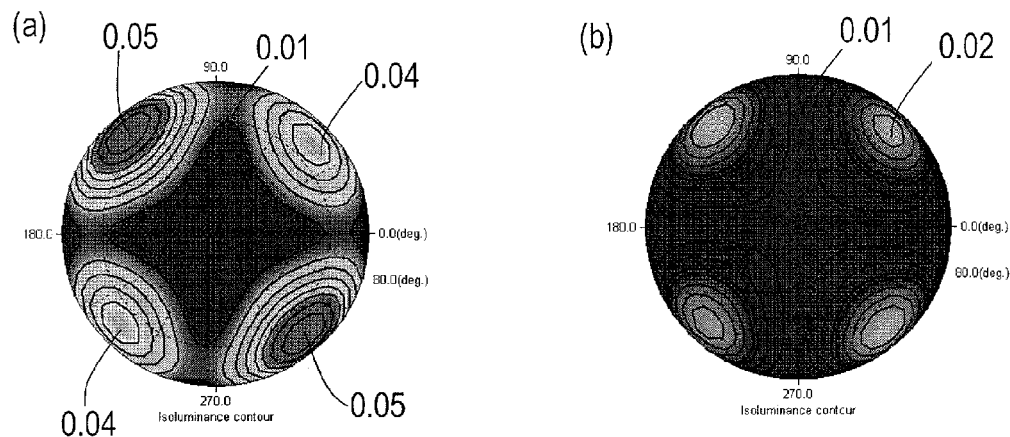
[FIG. 5] (a) shows iso-reflectance contours in the case where a λ/4 phase difference plate such that $N_z=1$ is used as the optical element 10; and (b) shows iso-reflectance contours in the case where a λ/4 phase difference plate such that $N_z=0.5$ is used as the optical element 10.

As can be seen from FIG. 5, when a λ/4 phase difference plate which has an in-plane phase difference of 137.5 nm with respect to light having a wavelength of 550 nm, such that $N_z=1$, is used, there is a region near a polar angle of 60° where the reflectance of the external light 70 is high. Since the region near a polar angle of 60° contains the viewing direction of the aerial image, if the reflectance of the external light 70 is high in this region, the visual recognition of the aerial image will be deteriorated. However, when a λ/4 phase difference plate which has an in-plane phase difference of 137.5 nm with respect to light having a wavelength of 550 nm, such that $N_z=0.5$, is used, even the reflectance of external light 70 near a polar angle of 60° is low, and therefore a biaxial phase difference plate is preferably used. Note that a uniaxial optical compensation element or biaxial optical compensation element may be used with a uniaxial or biaxial phase difference plate to ensure that $N_z$ is near 0.5; when the external light 70 obliquely strikes the optical element 10, the external light 70 can be restrained from going out from the optical element 10.

Next, an optical system 100 having the reflective imaging element 11 will be described.

The optical system 100 shown in FIG. 6 includes an object (e.g., a display panel) 30, and an optical element 10 having a first principal face which is struck by light 60 going out from the object 30 and a second principal face which is parallel to the first principal face. The optical system 100 causes an image which is displayed on the display surface of e.g. a display panel to form an image at a position 40 of planar symmetry with respect to the optical element 10 as a plane of symmetry. Moreover, 60a to 60f indicate polarization states of the light 60 contributing to image formation.

In the optical system 100, the optical element 10A is to be used when light from the object is circularly polarized light (or elliptically polarized light). When light from the object is linearly polarized light, the optical element 10B is to be used. In the case of using the optical element 10B, if the object is a display panel (e.g., a liquid crystal display device) having polarizers, for example, the display panel is preferably disposed so that, when viewing the first polarizer 22a and the display panel from the normal direction of the light-incident side of the optical element 10, the absorption axis of the polarizer at the display surface side of the display panel and the absorption axis of the first polarizer 22a of the optical element 10B are essentially parallel or essentially orthogonal. More preferably, the display panel is disposed so that, when viewing the first polarizer 22a and the display panel from a light direction in which light from the display panel strikes the optical element 10, the absorption axis of the first polarizer 22a and the absorption axis of the polarizer at the display surface side of the display panel are essentially parallel or essentially orthogonal to each other. The optical element 10C can be used even when light from the object is unpolarized light.

As the object 30, a display panel is preferably used, and, for example, a liquid crystal display panel which allows for easy control of the viewing angle is more preferably used. Otherwise, an organic EL display, a plasma display, a projector, or an LED display can also be used as the display panel. In the case where a display panel which does not permit easy viewing angle control is used, e.g., an organic EL display or a plasma display, a display panel which is adapted to the desired viewing angle needs to be obtained by using a viewing angle controlling film. Furthermore, in the case where a projector or an LED display is used as the display panel, there is strong light directivity and a narrow viewing angle, so that a lens for angling the rays needs to be employed between the display panel and the reflective imaging element 10.

As described above, with e.g. the first polarizer 22a and the first phase difference plate 21a included in the optical element 10, light which is ascribable to external light 70 (where 70a to 70e indicate polarization states of the external light 70) that is reflected at the surface of the reflective imaging element 11 can be restrained from going out from the light-outgoing side of the optical element 10. Moreover, as described above, stray light not contributing to image formation can be restrained from going out from the light-outgoing side of the optical element 10, whereby the visual recognition of the aerial image is improved. When the optical element 10 includes the optical compensation element 23, for example, the aerial image has a large viewing angle.

INDUSTRIAL APPLICABILITY

The present invention is broadly applicable to any optical system which has a reflective imaging element capable of forming an image of an object in a space and a display panel.

REFERENCE SIGNS LIST 10, 10A, 10B, 10C optical element
11 reflective imaging element
14, 15 specular element
20 transparent substrate
21 phase difference plate
30 object
40 position 60, 70 light
100, 100A, 100B, 100C optical system

The invention claimed is:

1. An optical element comprising:
    a reflective imaging element for reflecting light from an object an even number of times to cause an image of the object to be formed;
    a first polarizer disposed on a light-outgoing side of the reflective imaging element; and
    a first phase difference plate disposed between the reflective imaging element and the first polarizer.

2. The optical element of claim 1, further comprising an antireflection film on the light-outgoing side of the reflective imaging element, the first polarizer being disposed between the antireflection film and the first phase difference plate.

3. The optical element of claim 1, further comprising a transparent substrate on at least one of the light-outgoing side and a light-incident side of the reflective imaging element.

4. The optical element of claim 1, wherein the first phase difference plate includes a λ/4 plate.

5. The optical element of claim 1, wherein the first phase difference plate includes a λ/2 plate.

6. The optical element of claim 5, wherein,
    when principal axes of an index ellipsoid of the λ/2 plate are designated an a axis, a b axis, and a c axis, the c axis being the closest principal axis to a normal direction of a principal face of the λ/2 plate, and
    assuming respective principal refractive indices $n_a$, $n_b$, and $n_c$ thereon with respect to light having a wavelength of 550 nm, the λ/2 plate satisfies the relationship $n_a \geq n_b$, and satisfies $0.1 \leq N_z \leq 1$ where $N_z = (n_a - n_c)/(n_a - n_b)$; and
    an in-plane retardation Re of the λ/2 plate with respect to light having the wavelength of 550 nm satisfies the relationship 235 nm ≤ Re ≤ 310 nm.

7. The optical element of claim 4, wherein,
    when principal axes of an index ellipsoid of the λ/4 plate are designated an a axis, a b axis, and a c axis, the c axis being the closest principal axis to a normal direction of a principal face of the λ/4 plate, and
    assuming respective principal refractive indices $n_a$, $n_b$, and $n_c$ thereon with respect to light having a wavelength of 550 nm, the λ/4 plate satisfies the relationship $n_a \geq n_b$, and satisfies $0.1 \geq N_z \geq 1$ where $N_z = (n_a - n_c)/(n_a - n_b)$; and
    an in-plane retardation Re of the λ/4 plate with respect to light having the wavelength of 550 nm satisfies the relationship 100 nm ≤ Re ≤ 170 nm.

8. The optical element of claim 1, wherein,
    the first phase difference plate includes a uniaxial optical compensation element; and
    when principal axes of an index ellipsoid of the uniaxial optical compensation element are designated an a axis, a b axis, and a c axis, the c axis being the closest principal axis to a normal direction of a principal face of the uniaxial optical compensation element, and
    assuming respective principal refractive indices $n_a$, $n_b$, and $n_c$ thereon with respect to light having a wavelength of 550 nm, the relationship $n_c > n_a = n_b$ or $n_c = n_a > n_b$ is satisfied.

9. The optical element of claim 8, wherein,
    the first phase difference plate includes the uniaxial optical compensation element, the uniaxial optical compensation element being disposed so that the a axis or the b axis of the uniaxial optical compensation element and a slow axis of at least one phase plate among phase difference plates of the first phase difference plate other than the uniaxial optical compensation element are essentially parallel; and when principal axes of an index ellipsoid of the first phase difference plate are designated an a axis, a b axis, and a c axis, the c axis being the closest principal axis to a normal direction of a principal face of the uniaxial optical compensation element, and assuming respective principal refractive indices $n_a$, $n_b$, and $n_c$ thereon with respect to light having a wavelength of 550 nm and defining $N_z = (n_a - n_c)/(n_a - n_b)$,
    the relationship $0.1 \leq N_z \leq 1$ is satisfied.

10. The optical element of claim 1, wherein,
    the first phase difference plate includes a biaxial optical compensation element; and
    when principal axes of an index ellipsoid of the biaxial optical compensation element are designated an a axis, a b axis, and a c axis, the c axis being the closest principal axis to a normal direction of a principal face of the biaxial optical compensation element, and
    assuming respective principal refractive indices $n_a$, $n_b$, and $n_c$ thereon with respect to light having a wavelength of 550 nm, the relationship $n_c > n_a > n_b$ is satisfied.

11. The optical element of claim 10, wherein,
    the first phase difference plate includes the biaxial optical compensation element, the biaxial optical compensation element being disposed so that the a axis or the b axis of the biaxial optical compensation element and a slow axis of at least one phase plate among phase difference plates of the first phase difference plate other than the biaxial optical compensation element are essentially parallel; and
    when principal axes of an index ellipsoid of the first phase difference plate are designated an a axis, a b axis, and a c axis, the c axis being the closest principal axis to a normal direction of a principal face of the biaxial optical compensation element, and assuming respective principal refractive indices $n_a$, $n_b$, and $n_c$ thereon with respect to light having a wavelength of 550 nm and defining $N_z = (n_a - n_c)/(n_a - n_b)$,
    the relationship $0.1 \leq N_z \leq 1$ is satisfied.

12. The optical element of claim 6, wherein a tilting angle, being defined as an angle between the direction of the c axis and the normal direction of the principal face, is an incident angle of light incident on the optical element from the object.

13. An optical element comprising:
    a reflective imaging element for reflecting light from an object an even number of times to cause an image of the object to be formed;
    a first polarizer disposed on a light-outgoing side of the reflective imaging element;
    a first phase difference plate disposed between the reflective imaging element and the first polarizer; and
    a second phase difference plate disposed on a light-incident side of the reflective imaging element.

14. The optical element of claim 13, wherein the first phase difference plate and the second phase difference plate include a λ/4 plate.

15. The optical element of claim 13, wherein at least one of the first phase difference plate and the second phase difference plate includes a λ/2 plate.

16. The optical element of claim 13, comprising a second polarizer disposed on the light-incident side of the reflective imaging element, wherein,
    the second phase difference plate is disposed between the reflective imaging element and the second polarizer.

17. The optical element of claim 16, wherein,
when viewing the first polarizer and the second polarizer from a normal direction of a light-outgoing side of the optical element, or from a light direction in which the light from the object goes out from the optical element, the first polarizer and the second polarizer are disposed so that an absorption axis of the first polarizer and an absorption axis of the second polarizer are essentially parallel or essentially orthogonal.

18. An optical system comprising:
the optical element of claim 1; and
a display panel, as the object, disposed on a light-incident side of the optical element,
the optical system causing an image displayed on a display surface of the display panel to form an image at a position of planar symmetry with respect to the optical element as a plane of symmetry, wherein
light emitted from the display panel is circularly polarized light or elliptically polarized light.

19. An optical system comprising:
the optical element of claim 13; and
a display panel, as the object, disposed on a light-incident side of the optical element,
the optical system causing an image displayed on a display surface of the display panel to form an image at a position of planar symmetry with respect to the optical element as a plane of symmetry, wherein
light emitted from the display panel is linearly polarized light.

20. The optical system of claim 19, wherein the display panel is disposed so that, when viewing the first polarizer and the display panel from a normal direction of a light-outgoing side of the optical element, or from a light direction in which the light from the object goes out from the optical element, an absorption axis of a polarizer at the display surface side of the display panel and an absorption axis of the first polarizer are essentially parallel or essentially orthogonal.

* * * * *